United States Patent [19]

Pawlak et al.

[11] Patent Number: 4,886,137

[45] Date of Patent: Dec. 12, 1989

[54] ELECTROMAGNETIC CONTROL APPARATUS FOR VARYING THE DRIVER STEERING EFFORT OF A HYDRAULIC POWER STEERING SYSTEM

[75] Inventors: Andrzej M. Pawlak, Troy; David W. Graber, Millington; Jeffery A. Zuraski, Saginaw, all of Mich.

[73] Assignee: General Motors Corporation, Detroit, Mich.

[21] Appl. No.: 288,662

[22] Filed: Dec. 22, 1988

[51] Int. Cl.$^4$ ............................................. B62D 5/083
[52] U.S. Cl. ..................................... 180/142; 180/143; 180/148
[58] Field of Search ............... 180/132, 141, 142, 143, 180/148; 74/388 PS

[56] References Cited

U.S. PATENT DOCUMENTS

| | | | |
|---|---|---|---|
| 4,629,025 | 12/1986 | Brasier et al. | 180/142 |
| 4,765,427 | 8/1988 | Yonker | 180/143 |
| 4,778,021 | 10/1988 | Morishita et al. | 180/79.1 |
| 4,783,626 | 11/1988 | Shimizu | 324/208 |

FOREIGN PATENT DOCUMENTS 0241271  10/1986  Japan .................................. 180/142

Primary Examiner—Charles A. Marmor
Assistant Examiner—Wook Yoon
Attorney, Agent, or Firm—Mark A. Navarre

[57] ABSTRACT

A hydraulic power steering system having conventional relatively rotatable spool and valve body elements for flow regulation, a mechanically resilient element for generating a mechanical centering force in relation to the relative rotation of the spool and valve body which tends to restore the spool and valve body to a centered condition, and an integral electromagnetic mechanism which variably opposes the mechanical centering force to adjust the level of operator steering input required to produce a given level of power assist. The electromagnetic mechanism comprises an energized coil and a pair of flux conducting elements supported for rotation with the spool and valve body, respectively. The flux conducting elements have interleaved teeth which are magnetically coupled to the coil to define a magnetic circuit having an inter-tooth working air gap which varies with the relative rotation of the spool and valve body.

8 Claims, 5 Drawing Sheets

ELECTROMAGNETIC CONTROL APPARATUS FOR VARYING THE DRIVER STEERING EFFORT OF A HYDRAULIC POWER STEERING SYSTEM

This invention relates to an automotive hydraulic power assist steering system, and more particularly to an electromagnetic control apparatus for varying the driver steering effort required to produce a given level of power assist.

BACKGROUND OF THE INVENTION

The conventional hydraulic power assist steering system comprises a hydraulic actuator for moving the steering linkage in relation to the fluid flow supplied thereto, and a rotary hydraulic control valve assembly for controlling fluid flow to the actuator in relation to the operator exerted steering torque. The control valve generally includes a cylindrical valve body rotatable within the valve housing and a spool rotatably disposed within the valve body. Hydraulic fluid is supplied to a cavity formed in the spool, and the valve body is grooved to receive fluid flow in relation to the amount of relative rotation between spool and valve body. The fluid so received is then directed to the actuator so that steering assist is developed in relation to the relative rotation of the valve body and spool.

The spool is manually rotated by the operator of the vehicle and is connected to mechanically drive the steering linkage through a lost motion coupling. A resilient element, such as a torsion bar, couples the spool and valve body to provide a centering force for aligning the spool and valve body, and to permit relative rotation therebetween in relation to operator exerted steering torque, at least within the limitations of the lost motion coupling.

In systems of the type described above, the level of driver steering effort assist required to produce a given level of power assist depends primarily on the compliance of the torsion bar. If the torsion bar has relatively high compliance, a relatively low level of driver steering effort is required. This is generally desirable in low speed operation of a vehicle where relatively high steering forces are required. If the torsion bar has relatively low compliance, a relatively high level of driver steering effort is required. This is generally desirable in high speed operation of a vehicle where relatively low steering forces are required.

To overcome the engineering trade-off described above, various arrangements have been proposed for varying the driver steering effort for a given level of power assist as a function of vehicle speed. An example of one such arrangement is given in U.S. Pat. No. 4,629,025, issued to Brasier et al., Dec. 16, 1986, and assigned to the assignee of the present invention. In that arrangement, a controlled portion of the hydraulic fluid pump output is returned to the reservoir of the pump to reduce fluid flow to the steering actuator with increasing vehicle speed.

SUMMARY OF THE PRESENT INVENTION

The present invention is directed to a hydraulic power assist steering system having conventional relatively rotatable spool and valve body elements for flow regulation, a resilient element (such as a torsion bar) for generating a mechanical centering force/torque in relation to the relative rotation of the spool and valve body which tends to restore the spool and valve body to a centered condition of low hydraulic flow, and an integral electromagnetic mechanism which variably opposes the mechanical centering force/torque for adjusting the driver steering effort required to produce a given relative rotation of the spool and valve body, and hence, a given level of power assist.

The integral electromagnetic mechanism of this invention comprises an energized coil and first and second flux conducting elements supported for rotation with the spool and valve body, respectively. The flux conducting elements have interleaved teeth which are magnetically coupled to the coil, thereby to define a magnetic circuit having an inter-tooth working air gap which varies with the relative rotation of the spool and valve body. The flux conducting elements are relatively oriented such that the teeth of one element are equally displaced from juxtaposed teeth of the other element when the spool and valve body are in a centered relation for minimum hydraulic flow. When driver exerted steering force displaces the spool and valve body from the centered relation, the coil and flux conducting elements cooperate to produce a net magnetic attractive force which opposes the mechanical centering force of the resilient element, thereby defining an overall centering force which is less than the mechanical centering force.

The resilient element is designed to be relatively stiff (low compliance), as is generally desired at relatively high vehicle speeds. The coil current is scheduled in relation to vehicle speed and the relative displacement of the spool and valve body so that the effective compliance of the coupling is effectively increased with decreasing vehicle speed, thereby reducing the driver steering effort required to produce a given level of steering assist with decreasing vehicle speed. The relative displacement dependence is employed to linearize the magnetic attractive force. A driver preference input may also be used to tailor the response for individual tastes.

DESCRIPTION OF THE PREFERRED EMBODIMENT

Figure 1A:
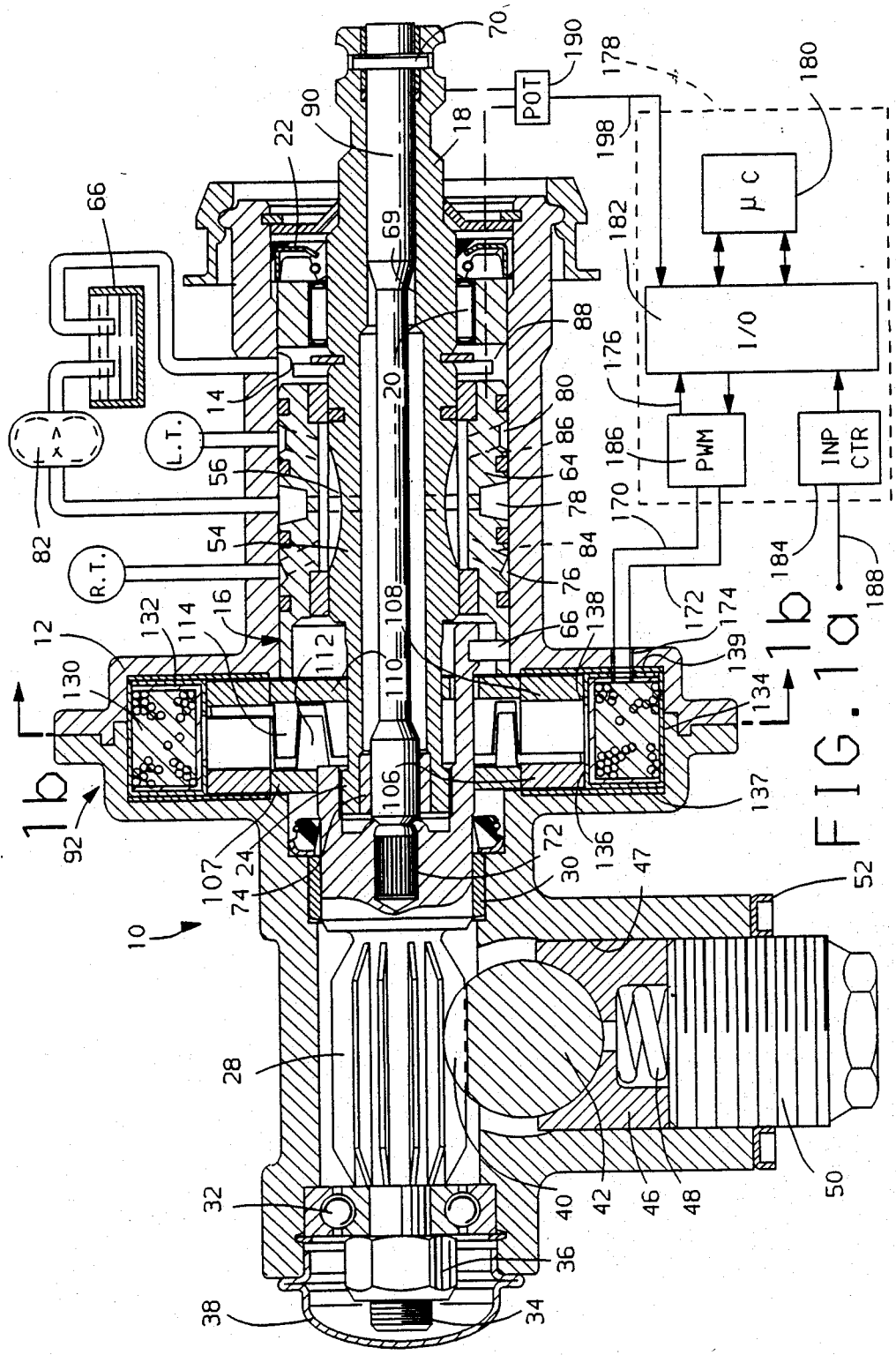
FIG. 1a is a sectional view of a hydraulic control valve assembly incorporating the integral electromagnetic mechanism of this invention and a block diagram of a computer-based controller therefor.
Figure 1B:
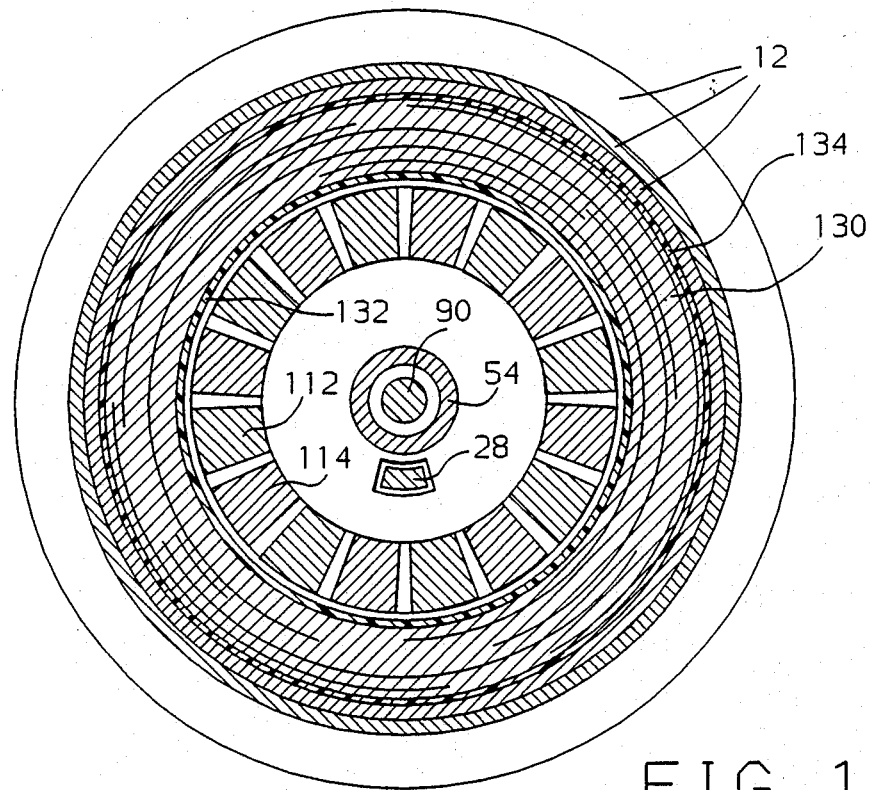
FIG. 1b is a section of the valve assembly of FIG. 1a along the line 1b—1b.

Referring to FIGS. 1a and 1b, the reference numeral 10 generally designates a portion of a motor vehicle hydraulic power assist rack and pinion steering gear. The steering gear 10 is disposed within a two-piece housing 12 having a cylindrical smooth wall bore 14 formed therein. A cylindrical rotary power steering gear valve assembly 16 disposed within the bore 14 includes an elongated cylindrical spool shaft 18 mounted for turning movement in the housing 12 by a bearing assembly 20. The inboard end of spool shaft 18 projects through an annular fluid seal 22 for connection to a conventional steering shaft and operator manipulated handwheel, not shown.

The outboard end of the spool shaft 18 is splined as indicated by the reference numeral 24 with an elongated pinion gear 28 to define a lost motion mechanical coupling therebetween. The pinion gear 28 is rotatably mounted in the housing 12 by the sleeve bearing 30 and a ball bearing assembly 32 which receives a shank portion 34 of pinion gear 28. A nut 36 threaded onto the outboard end of the shank portion 34 secures the pinion gear 28 with the housing 12. A cup-like cover 38 frictionally fits into the end of the housing 12 to provide service access.

The teeth of pinion gear 28 mesh with the toothed portion 40 of an elongated rack 42 mounted for linear sliding movement within the housing 12. The rack 42 is operatively connected to the steerable wheels of the vehicle by suitable ball joints and tie rods, not shown. In such an arrangement, the linear movement of the rack turns the steerable wheels of the vehicle for vehicle steering purposes.

The rack 42 is also coupled to a fluid operated power cylinder mechanism or actuator, not shown, for applying a steering assist force to rack 42. As described below, the power steering valve assembly 16 is adapted to direct hydraulic fluid to right or left turn chambers of the power cylinder to apply right-hand or left-hand steering assist force to rack 42. A power cylinder meeting the above description is described in detail in U.S. Pat. No. 4,454,801 to Spann, issued June 19, 1984, and assigned to the assignee of the present invention, such patent being incorporated herein by reference.

Close meshing engagement between the teeth of the pinion 28 and the rack 42 is achieved by the rack contact shoe 46 which is slidably mounted in the housing bore 47. A helical spring 48, seated between the contact shoe 46 and an adjusting plug 50, tensions the contact shoe 46. Plug 50 is threaded into the end of housing bore 47 and can be axially adjusted therein to vary the spring force. An adjuster plug nut 52 maintains the plug 50 in a selected position.

The spool shaft 18 of the power steering valve assembly 16 has a cylindrical valve spool 54 formed thereon. The spool 54 has a plurality of arcuate, axially extending oil transfer slots 56 formed in the periphery thereof. The valve assembly 16 also includes a cylindrical valve body 64 rotatably mounted within valve bore 14 on the valve spool 54. The outboard end of the valve body 64 extends over the end of the pinion 28 and is drivingly connected thereto by radial pin 66.

The valve body 64 defines right turn, supply and left turn chambers 76, 78, 80 between it and the valve bore 14. A hydraulic pump 82 supplies fluid to the supply chamber 78, and such fluid is directed to the right turn and left turn chambers 76, 80 via the slots 56 of valve spool 54 and the drilled passages 84 and 86, depending on the direction and degree of relative rotation between spool 54 and valve body 64. The right turn and left turn chambers 76, 80 are connected to the right (RT) and left (LT) chambers of the power cylinder (actuator) as indicated for generating a corresponding level of steering assist force in rack 42 as described above. An exhaust passage chamber 88 returns hydraulic fluid to the fluid reservoir 66 of pump 82. A detailed description of the valve 16 and the hydraulic system thereof is set forth in the above-referenced U.S. Pat. No. 4,454,801.

A resilient centering coupling between the valve spool 54 and valve body 64 is provided by the combined operation of a torsion bar 90 and the electromagnetic mechanism of this invention, generally designated by the reference numeral 92. Together, the torsion bar 90 and electromagnetic mechanism 92 permit the valve spool 54 to be rotated relative to the valve body 64 in relation to the operator exerted steering torque so that the valve 16 directs fluid to the power cylinder (not shown) for producing the desired level of steering assist force. On termination of the operator exerted steering torque, the torsion bar 90 centers the valve body 64 and spool 54 to terminate steering assist force.

The torsion bar 90 extends concentrically through an axial opening 69 in the spool shaft 18. A cross pin 70 connects the input end of torsion bar 90 to spool shaft 18. The output end of torsion bar 90 is splined and staked at 72 to the pinion 28. Bearing sleeve 74 supports the inner end of the spool shaft 18 on a cylindrical portion of the torsion bar 90.

The electromagnetic mechanism 92 comprises a pair of relatively rotatable magnetic flux conducting elements 106, 108 magnetically coupled to a stationary exciting coil 130. The element 106 is secured to the pinion 28 via a nonmagnetic core 107 for rotation with the valve body 64, and is magnetically coupled to the coil 130 via the pole pieces 136 and 137. The element 108 is secured to the valve spool 54 via a nonmagnetic core 110 for rotation therewith and is magnetically coupled to the coil 130 via the pole pieces 138 and 139. The coil 130 is wound in an insulating bobbin 132 and has lead ends 170, 172 passing through a suitable opening 174 in the housing 12 for connection to the computer-based control unit 178, described below.

Figure 2A:
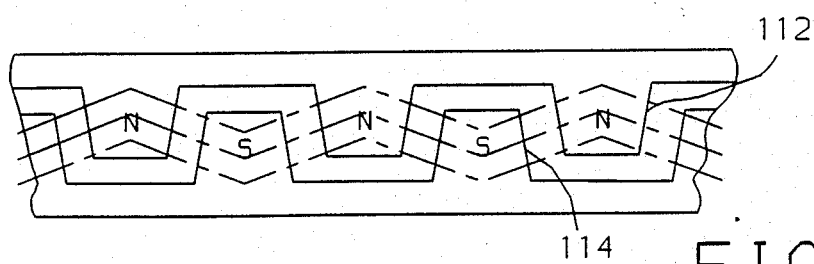
FIGS. 2a and 2b schematically depict linearized views of the magnetic flux conducting elements of the mechanism depicted in FIGS. 1a-1b.

The flux conducting elements 106, 108 have axially extending and interleaved teeth 112, 114 which permit a limited relative rotation without mechanical interference, the limit of such rotation being determined by the lost motion coupling described above. When the exiting coil 130 is energized with direct current, juxtaposed teeth 112, 114 assume alternate magnetic polarities as indicated in the linearized representations of FIGS. 2a-2b and magnetic flux encircles the coil 130, crossing the inter-tooth working air gaps.

The elements 106, 108 are angularly oriented at the installation thereof such that each tooth of one element is centered between a pair of teeth of the other element when the spool and valve body 54, 64 are mutually centered to produce minimum hydraulic flow. This condition is depicted by the linearized diagram of FIG. 2a. In this condition, the torsion bar 90 is fully relaxed and the integral electromagnetic mechanism of this invention is magnetically balanced, regardless of the coil energization. As a result, neither produces a net torque on the spool 54 or valve body 64.

Figure 2B:
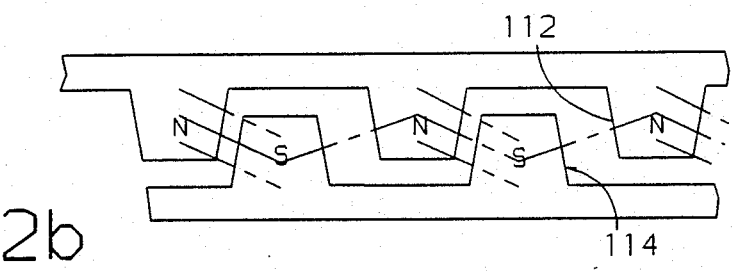

However, when there is a relative rotation of the spool and valve body elements 54, 64, mechanical energy is stored in the torsion bar 90 and the working air gaps between opposite polarity teeth 112, 114 of the electromagnetic mechanism 92 decrease as shown in FIG. 2b. As in a conventional steering system, the torsion bar 90 responds by exerting a mechanical centering torque which tends to restore the spool and valve body 54, 64 to their mutually centered condition. However, the reduced air gaps unbalance the electromagnetic mechanism 92, producing a net attractive force (torque) in relation to the coil current which aids the driver and opposes the mechanical centering torque. Thus, the net centering torque is determined by the difference between the mechanical centering torque and the magnetic attractive torque.

Figure 3A:
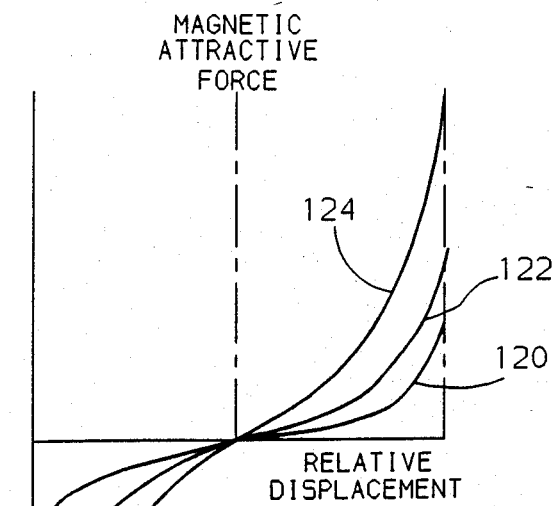
FIG. 3a graphically depicts the nonlinear attractive force generated by the electromagnetic mechanism of FIGS. 1a-1b as a function of relative displacement for various coil current magnitudes.

The magnetic attractive force varies as a function of the relative displacement and coil current as illustrated in the traces 120-124 of FIG. 3a. Trace 120 represents the force for relatively low coil current, trace 124 represents the force for relatively high coil current and trace 122 represents the force for an intermediate level of coil current.

Figure 3B:
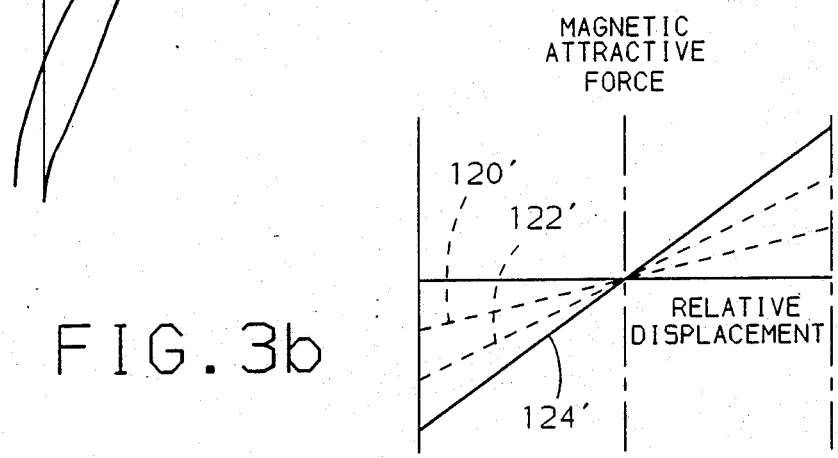
FIG. 3b graphically depicts the linearized attractive force generated by the electromagnetic mechanism of FIGS. 1a-1b as a function of relative displacement for various coil current magnitudes.

The traces 120'-124' of FIG. 3b illustrate a preferred, linear relationship between magnetic attractive force and relative displacement, corresponding to the nonlinear traces 120-124. This linearization may be achieved according to this invention either by suitably shaping the teeth 112, 114, or by scheduling the coil current as a function of the relative displacement as illustrated by the traces 128-132 of FIG. 3c. In the latter approach, the trace 128 represents the coil current for relatively high vehicle speeds, trace 132 represents the coil current for relatively low vehicle speeds and trace 130 represent the current for an intermediate vehicle speed. Such latter approach is employed in the illustrated embodiment and requires either a sensor for measuring the relative displacement or an estimation of the relative displacement based on readily available information characterizing the coil geometry and measured electrical parameters including the coil voltage and rate of change in coil current.

As indicated above, the effective resiliency of the coupling between valve spool 54 and valve body 64 is determined by the difference of the relatively large mechanical centering force of the torsion bar 90 and the relatively small electromagnetic attractive force of the electromagnetic mechanism 92 of this invention. The overall or net centering force is depicted as a function of relative displacement in FIG. 4. The torsion bar centering force is fixed for a given installation, but electromagnetic attractive force is variable with the exciting coil energization current, resulting in an overall centering force as represented by the family of curves shown in FIG. 4.

Figure 3C:
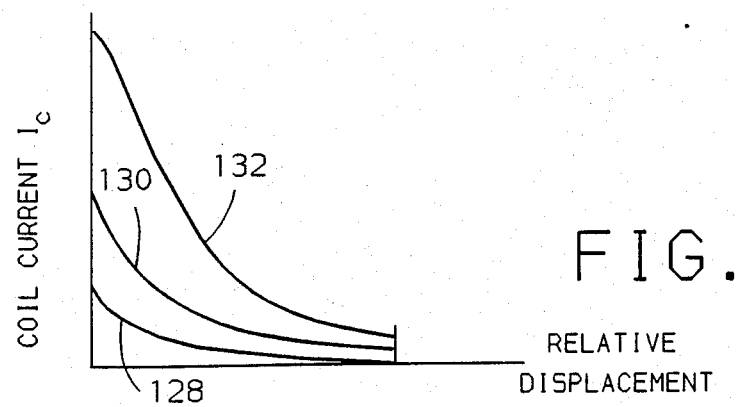
FIG. 3c graphically depicts the scheduled relationship between coil current and relative displacement for various vehicle speeds.
Figure 4:
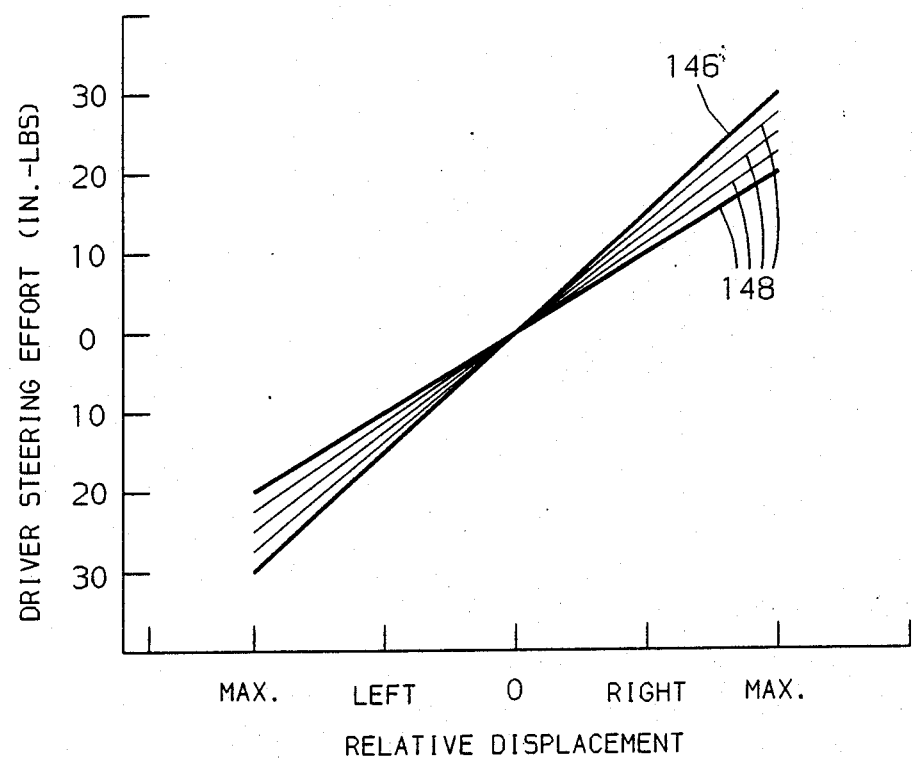
FIG. 4 graphically depicts the overall variation in driver steering effort for various vehicle speeds.

In a steering system incorporating the electromagnetic mechanism 92 of this invention, the torsion bar 90 is designed to be relatively stiff (low compliance) so that a relatively high level of driver steering effort is required to produce a given level of steering assist. This characteristic is generally desired at relatively high vehicle speeds, and is illustrated in FIG. 4 by the trace 146. The coil current is increased with decreasing vehicle speed as illustrated in FIG. 3c to reduce the overall or net centering torque, thereby reducing the level of driver steering effort required to produce a given level of steering assist. Successively increasing coil current levels produce assist characteristics represented by the traces 148 in FIG. 4. A driver preference input may also be used to tailor the response for individual tastes.

As indicated above, the maximum relative displacement limits (MAX) are defined by the splined lost motion coupling between spool shaft 18 and pinion gear 28. Once the maximum displacement has occurred, further rotation of the steering wheel is mechanically transmitted to the pinion gear 28 via the coupling. In the illustrated embodiment, the coupling permits relative displacements of approximately ±7 mechanical degrees.

The computer-based control unit 178 of FIG. 1 is supplied with operating power from the vehicle storage battery (not shown) and comprises a microcomputer (uC) 180, an input/output (I/O) device 182, an input counter (INP CTR) 184, and a pulse-width-modulation driver (PWM) 186, all of which may be conventional devices. The microcomputer 180 communicates with the remainder of the system via I/O device 182; in response to various input information, microcomputer 180 executes a series of predetermined program instructions for developing an output command pertaining to the required energization of the exciting coil 130. Program instructions are described below in reference to the flow diagram of FIG. 5.

The control unit inputs include an oscillatory vehicle speed signal on line 188, which may be obtained from a conventional speed pickup, not shown, and a relative displacement signal on line 198, which may be obtained from a conventional rotary potentiometer, schematically designated by the reference numeral 190. The speed signal is applied to the I/O device 182 through the input counter 184, which divides the frequency of the speed signal by a predetermined factor. The relative displacement signal is applied to an analog input port of the I/O device 182. The PWM command for exciting coil 130 is applied to a PWM driver 186 for correspondingly modulating the coil 130 with current from the vehicle storage battery, not shown. A signal indicative of the coil current is developed by the PWM driver 186 on line 176 with a suitable current shunt, such signal being applied as an input to an analog port of the I/O device 182 for use in a closed-loop control of the coil current. Open-loop voltage control may alternately be employed, if desired.

Figure 5:
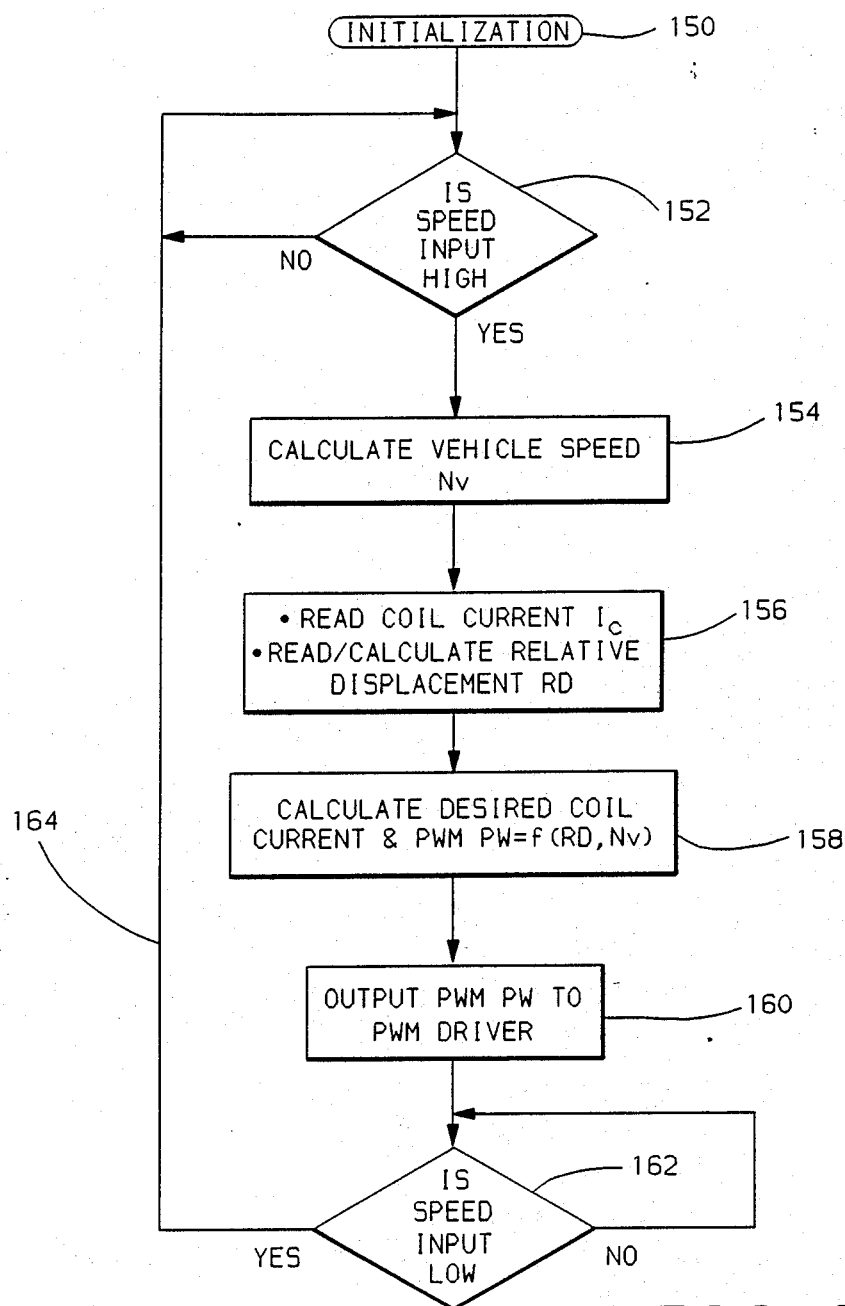
FIG. 5 is a flow diagram representative of computer program instructions executed by the computer based controller of FIG. 1 in controlling the excitation of the electromagnetic mechanism of this invention.

FIG. 5 depicts a simplified flow diagram representative of computer program instructions which would be executed by the computer-based control unit 178 of FIG. 1 in carrying out the control. The block 150 designates a series of program instructions executed at the initiation of each period of vehicle operation for initializing the various registers and program variable to predetermined values. Thereafter, the blocks 152-162 are executed as explained below.

The decision blocks 152 and 162 detect a low to high transition of the vehicle speed signal output of input counter 184. When the transition is detected, the instruction blocks 154, 156, 158 and 160 are sequentially executed to calculate the vehicle speed $N_v$, to read the relative displacement RD and coil current $I_c$, and to calculate and output a PWM pulse width to the PWM driver 186. Calculation of the vehicle speed at block 154 is based on the elapsed time between low-to-high transitions of the input counter carry bit, such time being inversely proportional to vehicle speed $N_v$. Calculation of the PWM pulse width command is based on the deviation of the desired coil current from the measured coil current $I_c$, the desired current being determined in accordance with vehicle speed and relative displacement, as indicated in FIG. 3c.

While this invention has been described in reference to the illustrated embodiment, various modifications will occur to those skilled in the art. In essential form, the control apparatus of this invention comprises a stationary coil and a pair of relatively rotatable flux conducting elements. The function of the magnetic circuits can be achieved with alternate configurations, and it should be understood that the scope of this invention is defined solely by the appended claims. Moreover, various control parameters, such as driver preference (light, medium, or heavy effort) or pressure feedback may be used, either separately or in combination with the above-described vehicle speed parameter.

The embodiments of the invention in which an exclusive property or privilege is claimed are defined as follows:

1. In a vehicular power assist steering system having first and second relatively rotatable hydraulic elements connected between a driver manipulated steering shaft and a steering gear for generating hydraulic flow in relation to their relative rotation, apparatus for variably coupling said hydraulic elements to vary the level of steering assist produced for a given driver manipulation of said steering shaft, comprising:

mechanical resilient means connected between said relatively rotatable hydraulic elements for developing a mechanical centering force in relation to such relative rotation which tends to restore said elements to a centered condition of minimum hydraulic flow; and electromagnetic circuit means including an energized coil and first and second toothed flux conducting elements magnetically coupled to said coil and supported for rotation with said first and second hydraulic elements, respectively, to define a magnetic circuit having a working air gap which varies with the relative rotation of said hydraulic elements, the flux conducting elements being angularly oriented such that the teeth of one element are equally attracted to juxtaposed teeth of the other element when said hydraulic elements are in said centered condition, whereby when said hydraulic elements are relatively displaced from said centered condition, the coil and flux conducting elements develop a net magnetic attractive force which opposes the mechanical centering torque in relation to the energization of said coil.

2. The apparatus set forth in claim 1, wherein the mechanical resilient means is a torsion bar.

3. The apparatus set forth in claim 1, including: control means for varying the energization of said coil, thereby to correspondingly vary the magnitude of the magnetic attractive force for a given relative displacement of said hydraulic elements.

4. The apparatus set forth in claim 3, wherein: the control apparatus varies the coil energization in relation to the speed of the vehicle, whereby the driver manipulation of said steering shaft required to produce a given relative rotation of said hydraulic elements, and hence the hydraulic flow, varies with the speed of the vehicle.

5. In a vehicular power assist steering system including first and second relatively rotatable hydraulic elements connected between a driver manipulated steering shaft and a steering gear for generating hydraulic flow, and hence, power assist in relation to their relative rotation, and mechanically resilient means coupling said hydraulic elements to produce mechanical centering force in relation to their relative rotation which tends to restore said elements to a centered condition of minimum hydraulic flow, magnetic coupling apparatus comprising:

an energized coil;

first and second flux conducting elements supported for rotation with said first and second hydraulic elements, respectively, and having interleaved teeth which are magnetically coupled to said coil, thereby to define a magnetic circuit having an inter-tooth working air gap which varies with the relative rotation of said hydraulic elements, the flux conducting elements being relatively oriented such that the teeth of one element are equally displaced from juxtaposed teeth of the other element when said hydraulic elements are in said centered condition, the coil and flux conducting elements cooperating to produce a net magnetic attractive force which opposes the mechanical centering force of said mechanically resilient means when said hydraulic elements are relatively rotated from said centered condition, thereby to define an overall centering force which is less than said mechanical centering force.

6. The apparatus set forth in claim 5, including: control means for varying the energization of said coil to correspondingly vary the magnitude of the overall centering force for a given relative rotation of said hydraulic elements, thereby to vary the driver steering effort required to produce a given level of driver steering assist.

7. The apparatus set forth in claim 6, wherein: the control means varies the coil energization in relation to the speed of the vehicle so that the driver steering effort required to produce a given level of power steering assist force, is variable with the vehicle speed.

8. The apparatus set forth in claim 7, wherein: the mechanical centering force of said mechanical resilient means is relatively high so that a relatively high level of driver steering effort is required to produce a given level of assist; and the control means increasingly energizes the exciting coil in inverse relation to the vehicle speed so that the driver steering effort required to produce a given level of assist increases in direct relation to the vehicle speed.

* * * * *